United States Patent Office 3,132,246
Patented May 5, 1964

3,132,246
METHOD FOR TREATING PLASTIC COATED PAPER TO IMPROVE THE ADHERENCE OF INK AND ADHESIVES THERETO
Owen D. Mosher, Glens Falls, N.Y., and Ronald P. H. Winder, Lexington, Mass., assignors to International Paper Company, New York, N.Y., a corporation of New York
Filed Nov. 30, 1960, Ser. No. 72,621
1 Claim. (Cl. 250—49.5)

The present invention relates to the treatment of plastic coated paper and more particularly to the treatment of the plastic surface of a plastic coated paper to improve the adherence of ink and adhesives thereto. The principal utility of the invention at the present time resides in the treatment of polyethylene coated paper, and, for convenience, the invention will be described primarily in connection with treatment of such polyethylene coated paper. But it should be understood that the principles of the invention are applicable to the treatment of other plastics which may be coated on paper and which plastics exhibit generally similar response to the treatment of the invention.

Various treatments for the surfaces of polyethylene and other plastic sheet materials to render them adherent to ink and glue have been suggested and used. Passing polyethylene through an electrical corona discharge is one of such treatments, and the general process involved is illustrated in a number of patents which have issued in recent years. These patents show considerable diversity in method and apparatus. Examples of the patents in the field of electrically treating polyethylene sheet material are British Patent 715,914, issued September 22, 1954; Berthold et al. United States Patent 2,881,470, issued April 14, 1959; Cunningham Patent 2,882,412, issued April 14, 1959; and Parks Patent 2,939,956, issued June 7, 1960.

The present invention is concerned with providing a method which provides an efficient treatment for polyethylene coated paper and which overcomes certain problems encountered in this specific area. Thus, a principal object of the invention has been to provide a novel and improved method for treating polyethylene coated paper to improve the adherence thereto of ink and glue.

The principles of the invention are applicable to a broad range of polyethylene thickness and a broad range of paper thicknesses. By way of example, the invention has been used with polyethylene coatings of the order of ¼ mil or less in thickness and 2 mils or more in thickness. Again by way of example, the invention has been used with papers ranging from very thin kraft paper to relatively heavy boxboard.

An important object of the invention has been to provide a method for treating polyethylene coated paper which is readily usable with a wide range of both plastic and paper thicknesses.

Another object of the invention has been to provide such a method which avoids the formation of pinholes in the polyethylene coated paper even when operating at low coating weights.

Another object of the invention has been to provide such a method which will produce a treatment that will not deteriorate substantially during storage over an extended period of time, e.g., two years or more.

Other and further objects, features and advantages of the invention will appear more fully from the following description, taken in connection with the drawings, in which.

Figure 1:
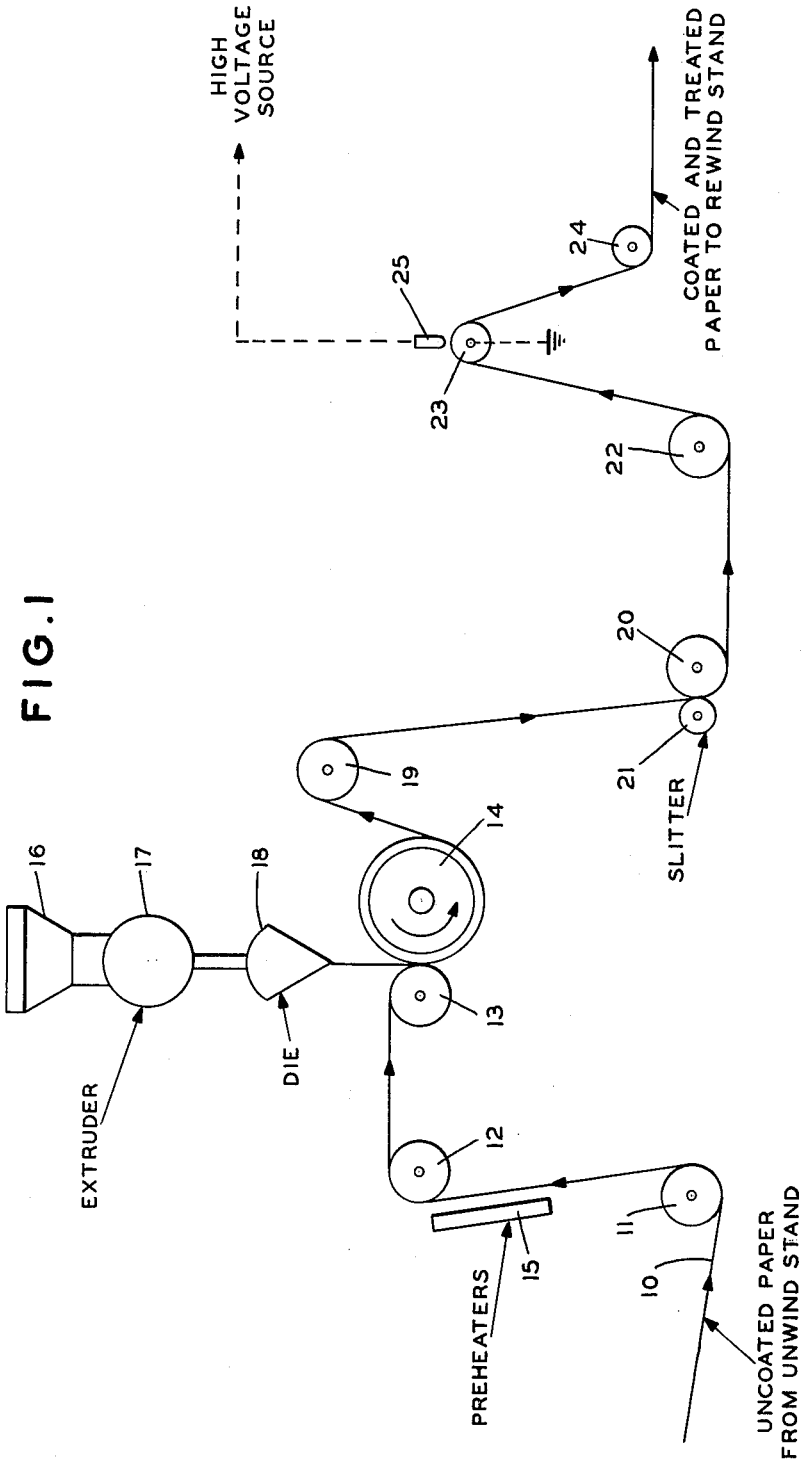
FIG. 1 is a diagrammatic side elevational illustration of one form of paper coating and treatment operation.

Referring now to the drawings, and more particularly to FIG. 1, a web 10 of uncoated paper which is being delivered from a roll supported on a suitable unwind stand (not shown) passes around an idler roll 11, then around another idler roll 12 and thence between a pressure roll 13 and a driven chill roll 14. The pressure roll 13 preferably has a surface covering made of neoprene or silicone rubber. The chill roll 14, which may be powered in any suitable way such as an electric motor and belt and pulley coupling, preferably has a chrome steel surface.

Preheating devices 15 of any suitable type are provided along the path of the web 10 between the idler rollers 11 and 12 to preheat the web surface prior to the extrusion thereon of the polyethylene coating, thereby facilitating bonding of the polyethylene to the web surface.

A hopper 16 receives polyethylene and delivers the same to an extruder 17 in which the polyethylene is melted and forced through a die 18 from whence the polyethylene is deposited on the surface of the web 10 adjacent the nip of the rolls 13 and 14. The polyethylene becomes firmly bonded to the paper surface upon passing between the rolls 13 and 14. The roll 14, which may be cooled, serves to chill the polyethylene coating, which, together with the pressure exerted by the rolls 13 and 14, aids in forming a tight bond. The pull exerted by the rolls 13 and 14 on the web 10 serves to advance the web from the unwind stand to the roll 14.

The coated web leaves the roll 14, passes over an idler roll 19, and then passes between rolls 20 and 21, which act as a slitter to cut the polyethylene which extends beyond the edges of the web. Preferably, the slitter will trim off a small amount of coated paper at each edge of the web to insure that no polyethylene film extends beyond the edges of the web.

From the slitter the coated and trimmed paper web passes around an idler roll 22, thence around a roll 23, and thence around a roll 24 and to a suitable powered rewind stand (not shown).

The roll 23 serves as the ground electrode for corona treatment of the polyethylene surface. For this purpose the roll 23 should be made of an electrically conductive metal, e.g., steel, and should be electrically connected to ground potential, as by slip rings on the roll end supporting shafts arranged to contact grounded brushes. The roll 23 requires a dielectric coating which should be carefully selected both as to material and thickness, as will be described in detail hereinafter. The coated web passes around the roll 23 and is arranged to contact the roll 23 over a wide arc, preferably of the order of 180°. Contact between the paper web and the surface of roll 23 should be tight, and for this purpose the coated web should be maintained under substantial tension, as by adjustment of the pulling force exerted by the rewind stand or spring loading one or more of the other coated web contacting rolls in a direction to maintain the desired tension.

The roll 23 may be powered but generally it will be operated as an idler roll rotating by action of the paper web.

The polyethylene surface of the coated web is disposed radially outward as the web passes around the roll 23 so that the uncoated paper surface is in contact with the dielectric coating on the roll 23.

The roll 23 should have an axial length at least equal to, and preferably greater than, the width of the coated web. An elongated narrow metallic electrode 25 is disposed parallel to the axis of the roll 23 and with a narrow surface thereof facing but radially spaced from the surface of the roll. This radial spacing is selected to provide an air gap between the polyethylene coated surface of the web and the adjacent narrow surface of the electrode 25. The width of this air gap will be dependent to some extent on factors such as voltage and dielectric strength, but generally ⅛ inch has been found satisfactory.

In the arrangement shown in FIG. 1, the axial length of the electrode 25 should be approximately equal to or greater than the width of the coated web. And in this arrangement it is desirable that the electrode 25 be positioned substantially midway between the points of tangency of the web and the roll 23 to maximize the circumferential length of contact between the web and the roll 23 on both sides of the electrode 25.

The electrode 25 is connected to the high (as distinguished from ground) side of a high voltage source of alternating current power. The voltage is selected to create a corona discharge in the space between the polyethylene coated surface of the web and the electrode 25. Care should be taken to avoid creation of an arc discharge since such a discharge has destructive effects on the polyethylene coating and the underlying paper web.

The corona discharge acting on the polyethylene surface alters the surface characteristics through a mechanism which is not clearly understood but which may involve chemical and/or potential distribution effects. In any event, the action of the corona discharge (and/or the action of the ozone produced thereby) on the polyethylene surface improves the characteristics of that surface with respect to retention of ink and with respect to retention of adhesives, thus facilitating subsequent printing or gluing of the polyethylene surface. Moreover, it appears that this treatment does not adversely affect the heat sealability characteristics of the polyethylene.

Figure 2:
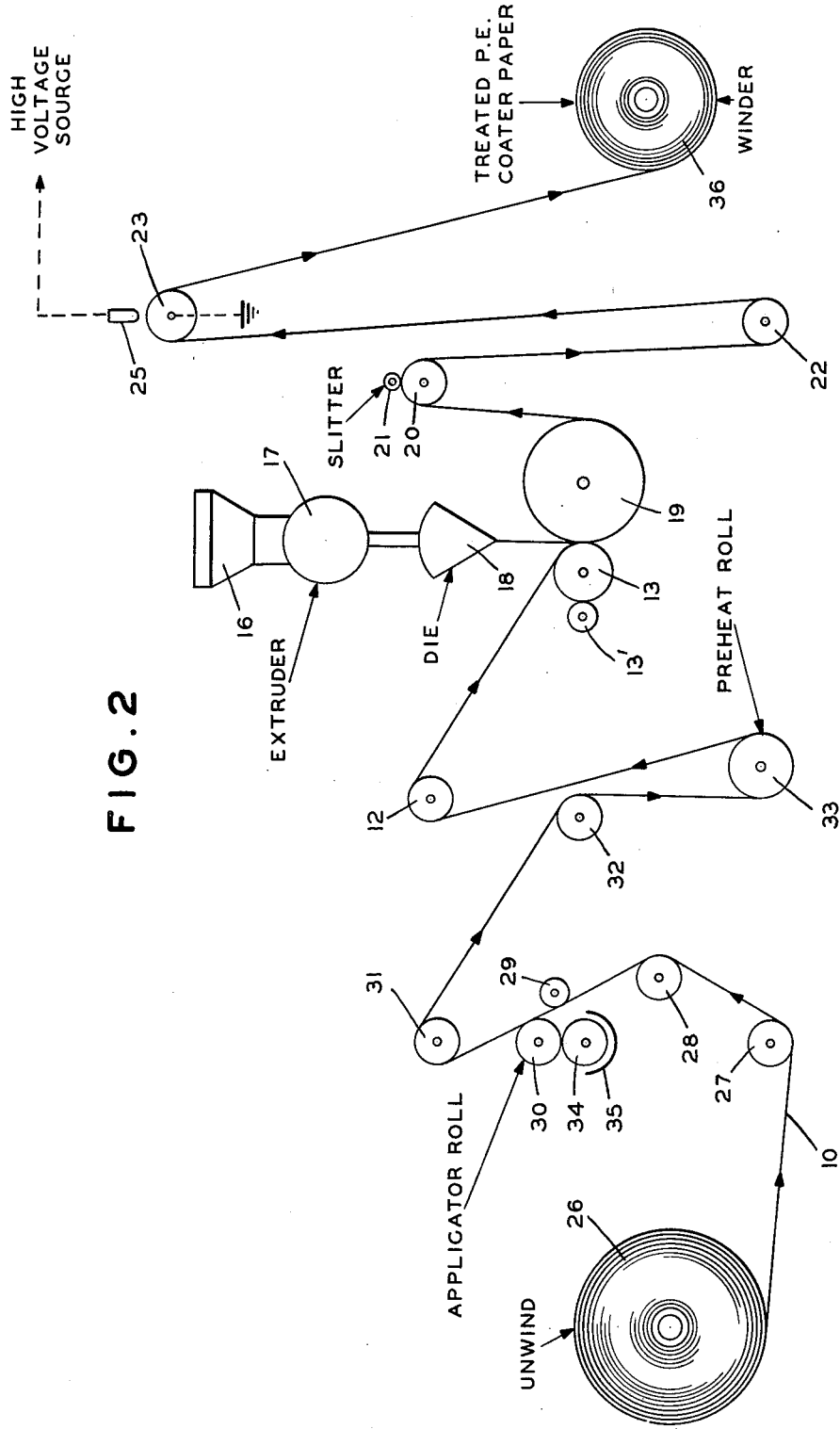
FIG. 2 is a diagrammatic side elevational illustration of another form of paper coating and treatment operation.

Referring now to FIG. 2, the coating and treatment operation illustrated is similar to that of FIG. 1 and like elements have been designated with like reference numerals. In FIG. 2 the paper web unwind stand is shown at 26 and the web 10 passes therefrom around rolls 27, 28, 29, 30, 31, 32 and 33. Roll 29 may be spring-urged against the web 10 to maintain contact between web 10 and roll 30. Roll 30 is an applicator roll which applies any desired coating to the web prior to application of the polyethylene coating by die 18. Roll 30 picks up its coating liquid from a roll 34 which in turn picks up the coating liquid from a trough 35. Roll 33 is preferably heated to perform the preheating function afforded in FIG. 1 by preheaters 15. A backing roll 13' may be provided in contact with pressure roll 13 to facilitate application of pressure to the coated web between pressure roll 13 and chill roll 19. Roll 22 may conveniently be spring-urged to maintain the desired tension on web 10 as it passes around ground roll 23. The coated and treated web is delivered from roll 23 to a winder 36.

Figure 3:
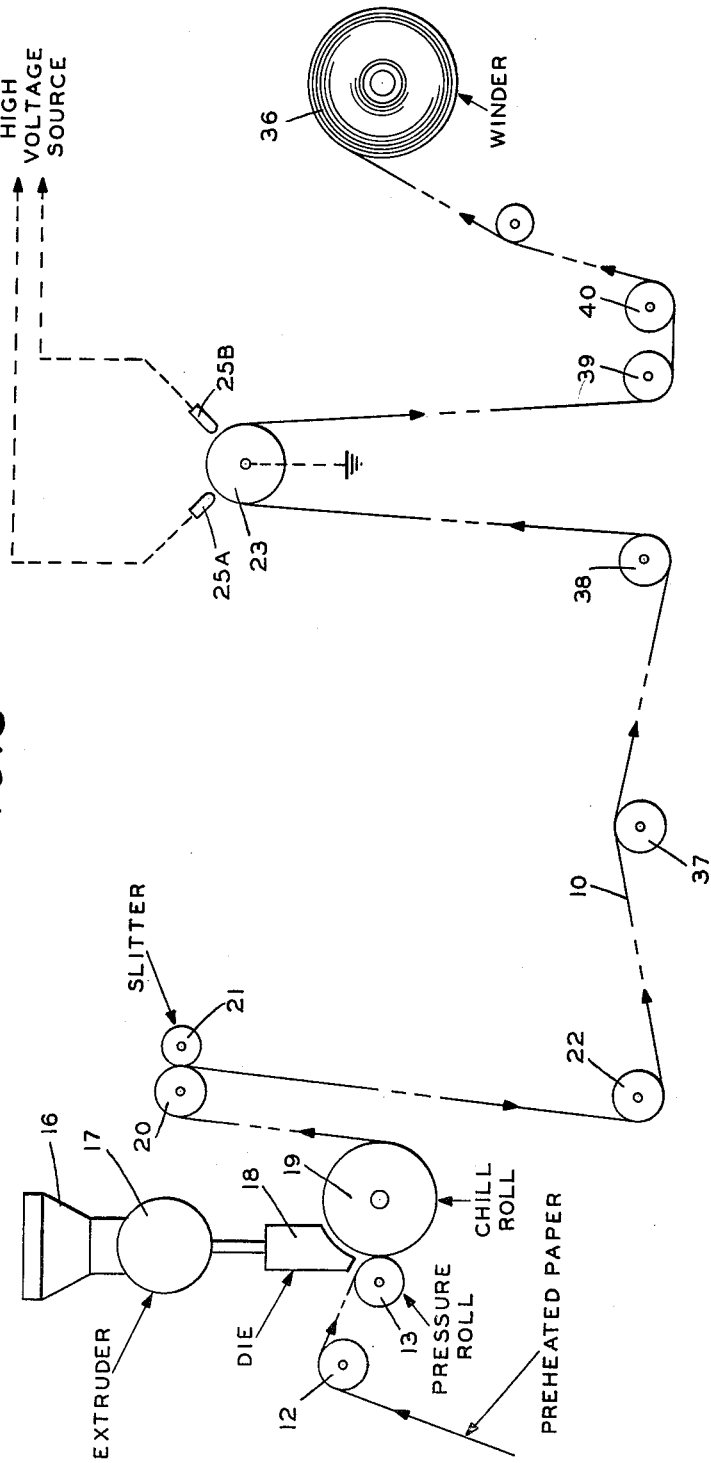
FIG. 3 is a diagrammatic side elevational illustration of yet another form of paper coating and treatment operation.

Referring now to FIG. 3, the arrangement is similar to that of FIGS. 1 and 2 and like reference numerals have been applied to like elements. Idler rolls 37 and 38 are interposed between rolls 22 and 23 and idler rolls 39 and 40 are interposed between roll 23 and winder 36. The rolls 38 and 39 are disposed so that the coated paper web passing around roll 23 is maintained in contact with the surface of roll 23 for substantially 180°. In FIG. 3 two electrodes 25A and 25B replace the electrode 25 of FIGS. 1 and 2. Each of the electrodes 25A and 25B may extend completely across the web width, in which case the corona discharge between each of these electrodes and the ground roll 23 contributes to the treatment of the entire polyethylene surface. However, the electrodes may be shorter than the web width and may be disposed so that each treats a respective portion of the web width.

Figure 4:
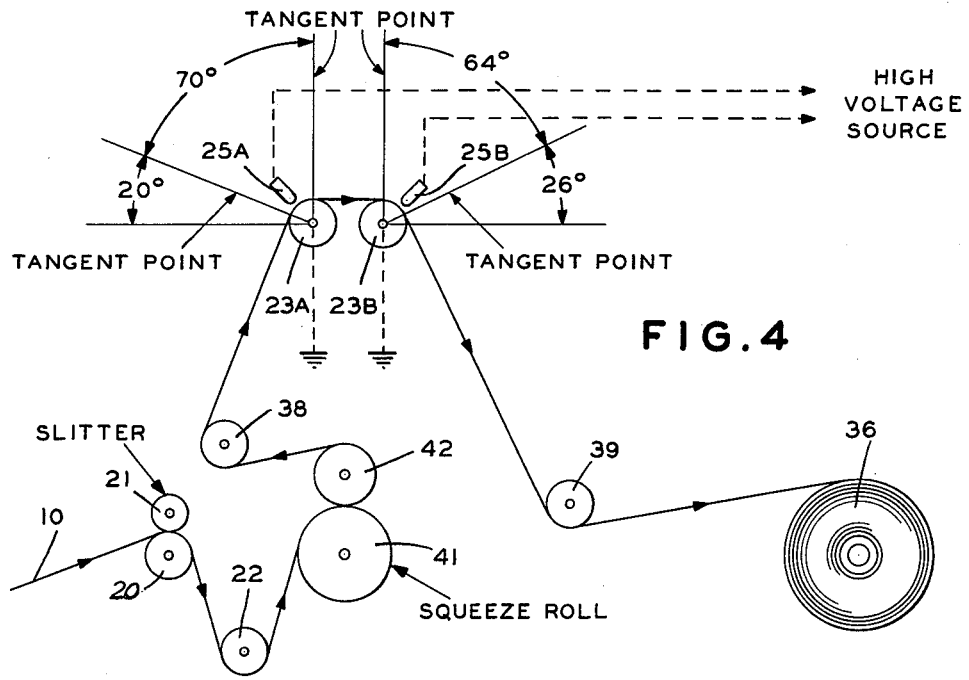
FIG. 4 is a diagrammatic side elevational illustration of a further form of paper coating and treatment operation.

The arrangement of FIG. 4 is similar to that of FIGS. 1–3 and like reference numerals have been applied to like elements. In FIG. 4 the polyethylene coated web which has been subjected to chilling and pressing, as described in connection with FIGS. 1–3, is subjected to edge slitting by rolls 20 and 21, passes around roll 22 and is then subjected to pressure application by being passed between squeeze rolls 41 and 42, one or both of which may be power driven.

In place of the single ground roll 23 of FIGS. 1–3, FIG. 4 shows two ground rolls 23A and 23B disposed at longitudinally spaced points in the path of the coated web. Electrodes 25A and 25B cooperate with rolls 23A and 23B, respectively, in the same manner as described for the electrodes 25A and 25B in connection with FIG. 3. Contact of the web 10 with the rolls 23A and 23B in FIG. 4 is shown as extending over arcs of 70° and 64°, respectively. These arcs of contact may be increased or decreased depending upon the diameter selected for rolls 23A and 23B so as to afford intimate contact between the web and the ground rolls for an adequate peripheral distance on each side of each of the electrodes 25A and 25B.

Figure 5:
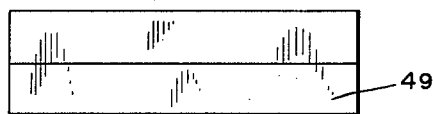
FIG. 5 is a cross-sectional view of a high potential electrode suitable for use in the practice of the invention.

FIG. 5 illustrates a suitable construction and mounting for the electrodes 25, 25A and 25B. As shown, the electrode 25 may be a rectangular conductive metal strip ⅛ inch in thickness and 1 inch in height. The length of the electrode 25 will be dependent on the width of the web to be treated and might be, for example, 18", 24", 90", or more. Preferably, the edges of the lower surface 43 (which faces the web) are rounded, as shown. About one-half the height of the electrode 25 is disposed within a socket formed in the end of a conductive metal support 44. Retention of the electrode 25 within the socket and good electrical contact between the electrode and the support 44 is afforded by means of axially spaced set screws such as the set screw 45. The electrode 25 and support 44 may be formed of any desired conductive metal or metals. By way of example, the electrode 25 may be brass and the support 44 aluminum. High voltage power is supplied to the support 44 (and from thence to electrode 25) by an insulated conductor 46 which is attached to support 44 by screw 47.

One or more porcelain or other suitable insulators 48 suspended from a frame member 49 mechanically support the electrode 25. For this purpose, the insulator 48 may be provided with a screw 50 adapted for threaded engagement in a hole provided in support 44. The frame member 49 is preferably movable so as to permit adjustment of the air gap and to facilitate threading of the web.

Figure 6:
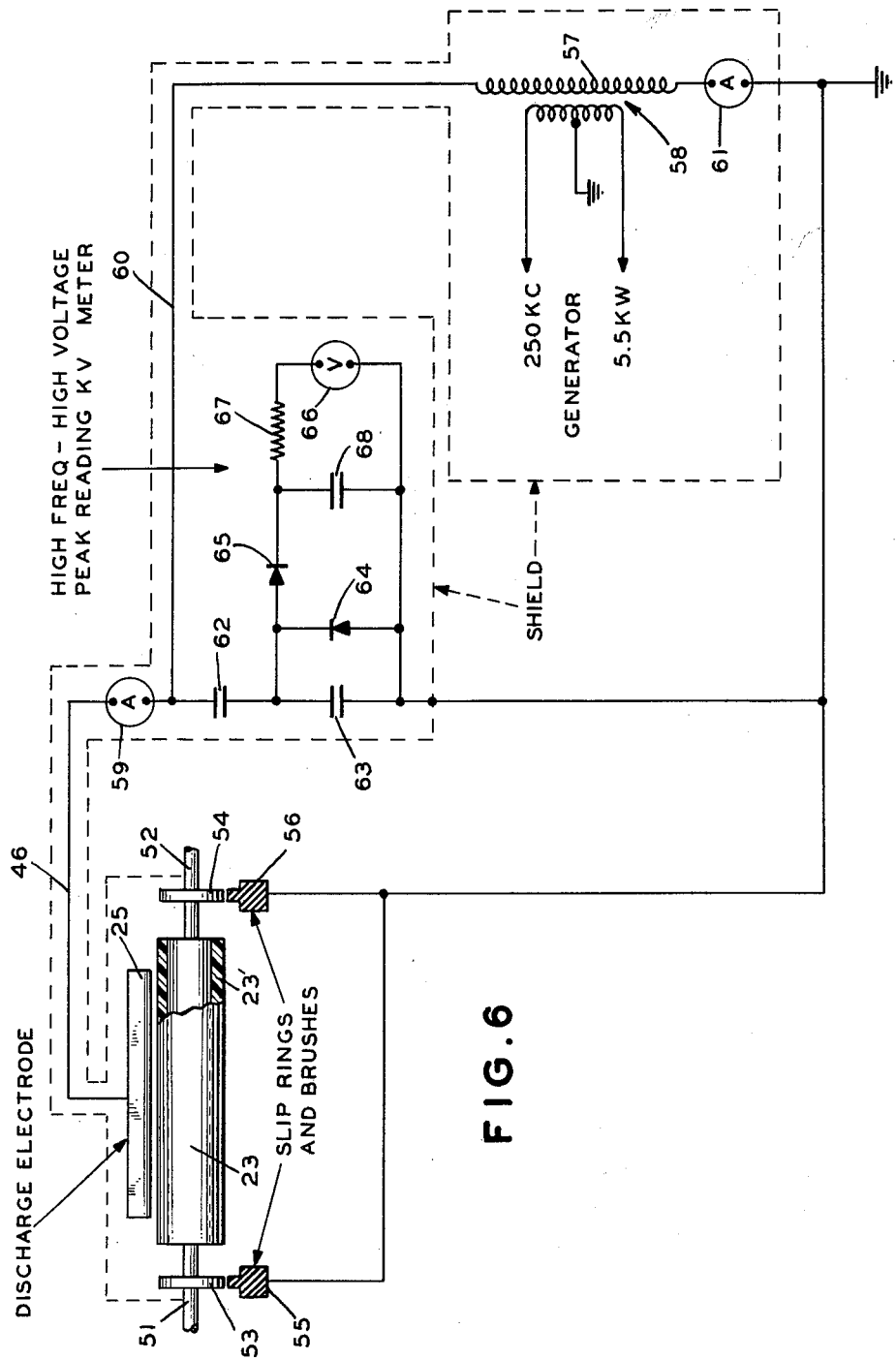
FIG. 6 is a diagrammatic view illustrating the relationship between the grounded roller electrode and the high potential electrode, and showing the circuit connections therefor.

A typical electrical arrangement in accordance with the invention is illustrated in FIG. 6. The steel roll 23, having a 3/16" dielectric coating 23', is supported in suitable bearings (not shown) by stub shafts 51 and 52 and is connected to ground through slip rings 53 and 54, which cooperate with brushes 55 and 56, respectively. Since relatively high frequency energy is to be used, good grounding is important for satisfactory operation.

Discharge electrode 25, which might be 90" long and disposed so as to provide about a ⅛" air gap between electrode 25 and the polyethylene coated paper surface passing over roll 23, is connected to the high potential end of secondary winding 57 of step-up transformer 58 through conductor 46, RF ammeter 59, and a conductor 60. The low potential end of winding 57 is coupled to ground through RF ammeter 61. The primary winding of transformer 58 is coupled to a suitable high frequency alternating current source, which might be, for example, a 250 kc., 5.5 kw. generator of the type shown in Weitmann Patent 2,583,979, which issued January 29, 1952, or of any other suitable A.C. generator which will deliver suitable high voltage, high frequency power.

A capacitive voltage divider formed by capacitors 62 and 63 connected in series between conductor 60 and ground is provided to facilitate voltage measurement and control. For example, capacitor 62 might be 15 micromicrofarads, while capacitor 63 might be 0.015 microfarad, affording a capacitance ratio therebetween of 1000:1. The alternating voltage developed across capacitor 63 is rectified by diodes 64 and 65. These rectifiers and capacitors 63 and 68 form a peak-to-peak rectifier circuit. The rectified voltage is supplied to a voltmeter 66 through a calibrating resistor 67. The voltmeter 66 is calibrated to read peak kilovolts. The high voltage cable and corona discharge system is enclosed in a grounded metal duct to reduce the effects of stray magnetic fields. By keeping the magnetic loop small, interference with radio reception is minimized.

The voltage between electrode 25 and ground should be sufficient to create a corona discharge in the air gap but should be insufficient for an arc discharge to form. The voltage employed may be varied considerably, but in general will lie between about 2 and 9 kv. peak. So far as degree of treatment of polyethylene is concerned, this will be related to the volt amperes per square foot of polyethylene surface treated.

Figure 7:
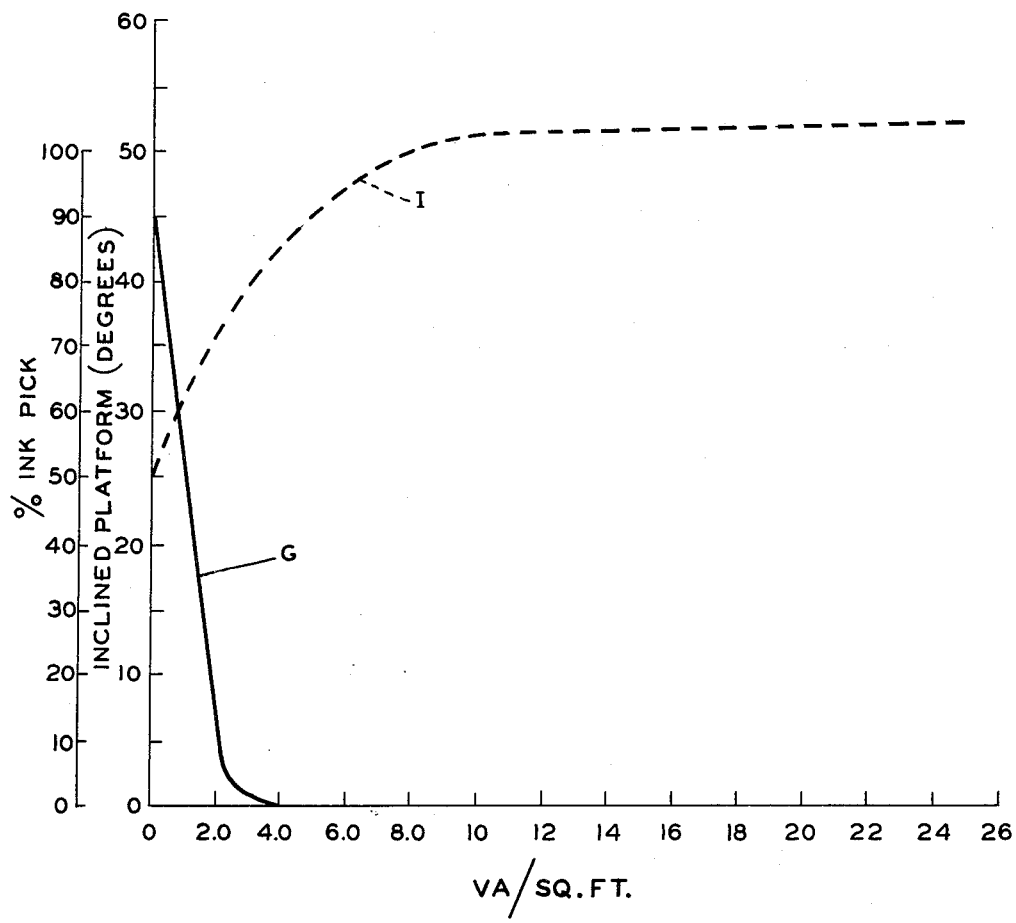
FIG. 7 is a set of curves showing the relationship between degree of treatment and ink retention.

FIG. 7 illustrates the relationship between ink retention and gluability on the one hand and variation in volt amperes on the other hand. Voltage is peak voltage between electrode 25 and ground, while amperage is the average RF current supplied to electrode 25. Curve I represents gluability and ink retention of the treated surface in terms of an inclined platform test as described in the article by T. F. McLaughlin, Jr., on pages 61 and 62 of the October 1960 "Paper, Film and Foil Converter" magazine. Curve G represents gluability and ink retention as measured by the so-called "Scotch tape test" in which pressure-sensitive cellophane tape is applied to an inked treated polyethylene surface and removed therefrom. The amount of ink left after removal of the tape determines the effectiveness of the treatment. It is desirable that the tape application and removal be effected by machine for purposes of standardization. As will be observed from FIG. 7, the "Scotch tape test," heretofore generally considered the standard test for ink retention, is not nearly so sensitive, at least for a polyethylene coated paper, as the inclined plane test. FIG. 7 also shows that a saturation point occurs at which more electrical energy in the treatment will not effectively increase ink retention or gluability. Operation in this saturation range has not been found to have any harmful effects on the polyethylene coated paper and the ink retention and gluability thereof. The curves of FIG. 7 represent a 40# unbleached kraft paper with a polyethylene coating and a speed of advance through the corona discharge of 130 feet per minute.

The dielectric layer 23' provided on the ground roll 23 (or on both ground rolls 23A and 23B) is important in achieving proper treatment of the polyethylene coating. Presence of this layer acts to spread out the field and prevent concentration thereof in a very limited area. One effect of this spreading out is to help prevent formation of minute holes in the polyethylene coating resulting from localized spark conditions. When the polyethylene coating is bonded to a comparatively rough paper surface, very small air pockets appear to be formed between the paper and the polyethylene coating. In the regions of such air pockets the polyethylene coating is particularly sensitive to such pinhole formation. The thickness of layer 23' may be varied depending upon materials and operating conditions. A 1/8" layer thickness produces satisfactory results, but for prolonged commercial operations a 3/16" layer is preferred. A number of dielectric materials may be used for the layer 23', but best results so far have been obtained with a chlorosulfonated polyethylene sold by E. I. du Pont de Nemours & Co. (Inc.) under the trademark Hypalon 20, which has a dielectric strength of about 400–750 volts/mil. The dielectric layer 23' preferably has a dielectric constant of about 4, a hardness of 80 (as measured on a Shore durometer) and a substantial resistance to chemical breakdown under the action of ozone.

It is important that the paper web be in intimate contact with the ground roll on both sides of the electrode for a substantial peripheral distance on each side of the electrode to prevent back ionization. That is to say, if an air gap exists between the paper and the ground roll in the region of space between the electrode 25 and the ground roll 26 which is subjected to an ionizing stress, there will be a tendency for a corona discharge to appear in this gap and to attack the uncoated side of the paper. It has been found that such a discharge on the uncoated side of the paper will greatly increase the tendency for pinholes to be formed in the polyethylene coating and also in the paper web itself, especially at points where paper surface irregularities project above the plane of the under surface of the polyethylene coating or produce air pockets. In general, satisfactory operation requires that the peripheral distance between the tangent point of the web and the ground roll and the point on the ground roll opposite the center of the high potential electrode be at least three inches, but it is highly preferable that this distance be at least about five inches. A five inch peripheral distance would require a peripheral distance between the tangent points of the web and ground roll on either side of the electrode of ten inches. Pinhole formation is also retarded by maintaining the coated web under substantial tension while it is in contact with the ground roll. This tension may be controlled, as by use of a spring-urged idler pulley in the web path. It does not appear that polyethylene density has any substantial effect on pinhole formation, but increased polyethylene thickness does reduce pinhole formation.

When more than one electrode is used, as in FIGS. 3 and 4, spacing between electrodes should be such that there is substantially no overlap of their respective corona discharge fields. It is desirable that each electrode be connected to a separate high voltage source, but this is not essential. Where the electrodes are connected to separate power supplies, the separation between electrodes should be sufficient to prevent ionization of the air space therebetween at peak to peak inverse voltage.

As mentioned previously, the degree of treatment of the polyethylene surface is basically dependent on the energy (volt-amperes) of the corona discharge to which the polyethylene surface is subjected. But it is not necessary that the energy all be supplied in a single corona discharge field. Thus, in FIGS. 3 and 4 the volt-amperes of treatment (assuming both electrodes to extend across the entire web width) is the sum of the volt-amperes of the respective fields associated with the electrodes 25A and 25B. Where very high web speeds are involved, use of two electrodes or even more linearly spaced along the web path facilitate energy delivery to the polyethylene surface. The amount of energy which can be delivered between a single electrode and ground roll is limited, of course, by the requirement that an arc discharge be prevented; hence, use of a plurality of spaced electrodes facilitates high speed operation.

While the invention has been described in connection with specific embodiments thereof and in specific uses, various modifications thereof will occur to those skilled in the art without departing from the spirit and scope of the invention as set forth in the appended claim.

What is claimed is:
The method of treating a paper web having a polyethylene coating on one surface thereof to improve the ink adherence and gluability characteristics of the outer surface of said polyethylene coating, comprising creating a high voltage corona discharge between an elongated narrow electrode and a grounded metal roll having a thin dielectric layer on the outer surface thereof, said electrode and said roll being parallel to each other and being spaced apart to provide an air gap in which said discharge occurs, passing said web through said air gap with said polyethylene coated surface of said web facing said electrode and the opposite surface of said web in intimate contact with said roll, maintaining said intimate contact between said web and said roll for a peripheral distance of at least about five inches around said roll on each side of a line joining the center of said roll and the center of the adjacent surface of said electrode, at least a major proportion of said peripheral distances extending circumferentially beyond the edges of said electrode whereby no separation of said web and said roll occurs in any portion of said air gap subjected to substantial ionizing stress thereby preventing the appearance of a corona discharge between said web and said roll, maintaining said web under substantial lengthwise tension while said web is in contact with said roll, and relating the energy in said corona discharge and the speed of travel of said web so that said web is subjected to a corona discharge energy not less than about 10 volt amperes per square foot.

References Cited in the file of this patent

UNITED STATES PATENTS

| | | |
|---|---|---|
| 2,859,480 | Berthold et al. | Nov. 11, 1958 |
| 2,864,756 | Rothacker | Dec. 16, 1959 |
| 2,939,956 | Parks | June 7, 1960 |
| 2,969,463 | McDonald | Jan. 24, 1961 |
| 2,984,585 | Sherman | May 16, 1961 |